US011321769B2

(12) United States Patent
Zhou et al.

(10) Patent No.: US 11,321,769 B2
(45) Date of Patent: May 3, 2022

(54) SYSTEM AND METHOD FOR AUTOMATICALLY GENERATING THREE-DIMENSIONAL VIRTUAL GARMENT MODEL USING PRODUCT DESCRIPTION

(71) Applicants: Beijing Jingdong Shangke Information Technology Co., Ltd., Beijing (CN); JD.com American Technologies Corporation, Mountain View, CA (US)

(72) Inventors: Hui Zhou, Sunnyvale, CA (US); Yi Xu, Palo Alto, CA (US); Shanglin Yang, Sunnyvale, CA (US)

(73) Assignees: BEIJING JINGDONG SHANGKE INFORMATION TECHNOLOGY CO., LTD., Beijing (CN); JD.COM AMERICAN TECHNOLOGIES CORPORATION, Mountain View, CA (US)

( * ) Notice: Subject to any disclaimer, the term of this patent is extended or adjusted under 35 U.S.C. 154(b) by 216 days.

(21) Appl. No.: 16/664,689

(22) Filed: Oct. 25, 2019

(65) Prior Publication Data
US 2020/0151807 A1    May 14, 2020

Related U.S. Application Data

(60) Provisional application No. 62/767,220, filed on Nov. 14, 2018, provisional application No. 62/767,214, filed on Nov. 14, 2018.

(51) Int. Cl.
*G06Q 30/06*     (2012.01)
*G06N 3/08*      (2006.01)
(Continued)

(52) U.S. Cl.
CPC ......... *G06Q 30/0643* (2013.01); *G06K 9/628* (2013.01); *G06N 3/08* (2013.01);
(Continued)

(58) Field of Classification Search
None
See application file for complete search history.

(56) References Cited

U.S. PATENT DOCUMENTS

2004/0227752 A1    11/2004  McCartha et al.
2018/0047192 A1*   2/2018   Kristal ............... G06Q 30/0643
2020/0066029 A1*   2/2020   Chen .................... G06T 15/04

FOREIGN PATENT DOCUMENTS

CN     102982578 A     3/2013
CN     103473806 A    12/2013
(Continued)

OTHER PUBLICATIONS

Bin Zhou et al., Garment Modeling from a Single Image, Pacific Graphics, 2013, vol. 32, No. 7.
(Continued)

*Primary Examiner* — Jeffrey J Chow

(57) ABSTRACT

A method and system for generating a three-dimensional (3D) model of a garment. The method includes: providing an image of the garment; generating a 3D garment representation based on the image; registering the 3D garment representation to a 3D model to obtain a preliminary 3D garment model; projecting the preliminary 3D garment model dressed on the 3D model to an 2D projected image; and comparing the 2D projected image with the image of the garment, so as to refine the preliminary 3D garment model to obtain the final 3D model of the garment.

20 Claims, 13 Drawing Sheets

(51) Int. Cl.
  G06T 7/162       (2017.01)
  G06K 9/62        (2022.01)
  G06T 15/04       (2011.01)
  G06T 15/20       (2011.01)
  G06T 7/73        (2017.01)

(52) U.S. Cl.
  CPC ............... *G06T 7/162* (2017.01); *G06T 7/75* (2017.01); *G06T 15/04* (2013.01); *G06T 15/205* (2013.01)

(56) References Cited

FOREIGN PATENT DOCUMENTS

CN          104123753 A      10/2014
CN          104978762 A      10/2015

OTHER PUBLICATIONS

Shan Yang et al., Detailed garment recovery from a single-view image, 2016, ArXiv:1608.01250v4.

Moon-Hwan Jeong et al., Garment capture from a photograph, Comp. Anim. Virtual Worlds, 2015, vol. 26: 291-300.

The Stanford Natural Language Processing Group, Knowledge Base Population (KBP) (https://nlp.stanford.edu/projects/kbp/).

Ziwei Liu et al., Fashion landmark detection in the wild, 2016, ArXiv:1608.03049v1.

Marvelousdesigner, Bring the efficiency of fashion design to computer graphics (https://www.marvelousdesigner.com/product/overview).

Varun Ramakrishna et al., Pose machines: articulated pose estimation via inference machines, (http://www.cs.cmu.edu/~vramakri/poseMachines.html).

Vivek Kwatra et al., Graphcut textures: image and video synthesis using graph cuts, ACM Transactions on Graphics (TOG), 2003, vol. 22, issue 3.

Shaoqing Ren et al.. Faster R-CNN: towards real-time object detection with region proposal networks, 2016, arXiv:1506.01497v3.

Jituo Li et al., Fitting 3D garment models onto individual human models, Computers & Graphics, 2010, vol. 34(6):742-755.

Remi Brouei et al., Design preserving garment transfer, ACM Transactions on Graphics, 2012.

Jeong, Moon-Hwan et al., Garment capture from a photograph, computer Animation and Virtual Worlds, 2015.

PCT/CN2019/118473, International Search Report dated Feb. 3, 2020.

* cited by examiner

SYSTEM AND METHOD FOR AUTOMATICALLY GENERATING THREE-DIMENSIONAL VIRTUAL GARMENT MODEL USING PRODUCT DESCRIPTION

CROSS-REFERENCES

This application claims priority to and the benefit of, pursuant to 35 U.S.C. § 119(e), U.S. provisional patent application Ser. Nos. 62/767,214 and 62/767,220, both filed Nov. 14, 2018, which are incorporated herein in their entireties by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to generating three-dimensional (3D) virtual garment model, and more particularly to system and methods for automatically generating 3D virtual garment model using both text description and image representation of a product.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

E-commerce has been a significant part of social life, and there are millions of fashion products for sale on online retail platforms such as amazon.com, jd.com and alibaba.com. Although picture of clothes and picture of clothes dressed on models are usually provided by the platforms, 3D representation of the garment on fashion model is not available.

Therefore, a demand exists in the art to address the aforementioned deficiencies and inadequacies.

SUMMARY

In certain aspects, the present disclosure relates to a method for generating a three-dimensional (3D) model of a garment (i.e., 3D garment model). The method includes:
  providing, by a computing device, description and at least one image of the garment;
  identifying, by the computing device, type and attributes of the garment from the description;
  classifying, by the computing device, the at least one image to obtain classification of the at least one image as a garment image having the garment or the model image having the garment dressed on a first model;
  segmenting, by the computing device, the at least one image based on the type of the garment and the classification of the image to obtain a mask of the garment;
  determining, by the computing device, landmarks of the garment in the at least one image using the mask, and parsing the garment in the at least one image into a plurality of parts, where the parsing may or may not use the landmarks;
  fitting, by the computing device, the landmarks to a 3D garment template corresponding to the type of the garment to obtain 3D garment representation;
  registering, by the computing device, the 3D garment representation to a second model to obtain a preliminary 3D garment model, where the 3D garment model is dressed on the second model, and the second model is a 3D human body model;
  projecting, by the computing device, the preliminary 3D garment model dressed on the second model to at least one 2D projected image; and
  comparing, by the computing device, the at least one 2D projected image with corresponding one of the at least one model image, so as to refine the preliminary 3D garment model to obtain the final 3D garment model.

In certain embodiments, the type of the garment is a category of the garment including sweater, shirt, skirt, T shirt and pant, and the attributes of the garment includes color, material, neckline, and gender of the garment. In certain embodiments, the step of identifying the type and attribute of the garment is performed by retrieving the type and attribute from a product database or by extracting the type and attribute from a shopping webpage of the garment.

In certain embodiments, the step of classifying the at least one image is performed by a neural network, the neural network includes concatenated convolution blocks to extract semantic features from the at least one image, and each of the convolution blocks includes a 2D convolution layer, a maxpooling layer, and a batch norm layer.

In certain embodiments, the step of segmenting the at least one image includes, when the at least one image is classified as the garment image: segmenting the at least one image using graph cut.

In certain embodiments, the step of segmenting the at least one image includes, when the at least one image is classified as the model image: locating a bounding box enclosing garment region of the at least one image using Faster region convolutional neural network (Faster R-CNN), and segmenting the at least one image using Fully convolutional neural network (FCN).

In certain embodiments, the step of determining landmarks is performed using a neural network.

In certain embodiments, the step of determining the landmarks and parsing the garment includes deforming a 2D garment template to the mask, where the 2D garment template is retrieved based on the type of the garment, and includes landmark points and parsing of the 2D garment template.

In certain embodiments, the method further includes:
  after classifying the at least one image as a model image:
    estimating pose of the first model in the model image; and
  before the step of projecting: positioning the second model in the estimated pose of the first model in the model image.

In certain embodiments, the method further includes rendering texture on the preliminary 3D garment model, the final 3D garment model, and intermediate 3D garment models intermediate between the preliminary 3D garment model and the final 3D garment model.

In certain aspects, the present disclosure relates to a method for generating a three-dimensional (3D) garment model of a garment. In certain embodiments, the method includes:

providing, by a computing device, at least one image of the garment;

generating, by the computing device, a 3D garment representation based on the at least one image;

registering, by the computing device, the 3D garment representation to a 3D model to obtain a preliminary 3D garment model dressed on the 3D model;

projecting the preliminary 3D garment model dressed on the 3D model to at least one 2D projected image; and comparing the at least one 2D projected image with corresponding one of the at least one image, so as to refine the preliminary 3D garment model to obtain the final 3D garment model of the garment.

In certain embodiments, the method further includes classifying the at least one image of the garment as a garment image having the garment only and a model image having the garment dressed on a first model. In certain embodiments, the method further includes estimating a pose of the first model in the model image to obtain an estimated pose; and positioning the 3D model in the estimated pose. In certain embodiments, the first model is a 2D model, and the 3D model is a 3D human body model.

In certain embodiments, the method further includes, before generating the 3D garment representation: determining landmarks of the garment in the at least one image, and fitting the landmarks to a 3D garment template to obtain the 3D garment representation.

In certain embodiments, the method further includes identifying type and attributes of the garment from description of the garment.

In certain embodiments, the steps of generating, registering, projecting and comparing are iteratively performed until the difference between the 2D projected image and the model image is less than a predetermined value.

In certain aspects, the present disclosure relates to a system for generating a 3D garment model. The system includes a computing device. The computing device has a processor and a storage device storing computer executable code. The computer executable code, when executed at the processor, is configured to perform the methods described above.

In certain aspects, the present disclosure relates to a non-transitory computer readable medium storing computer executable code. The computer executable code, when executed at a processor of a computing device, is configured to perform the method as described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION

Figure 1:
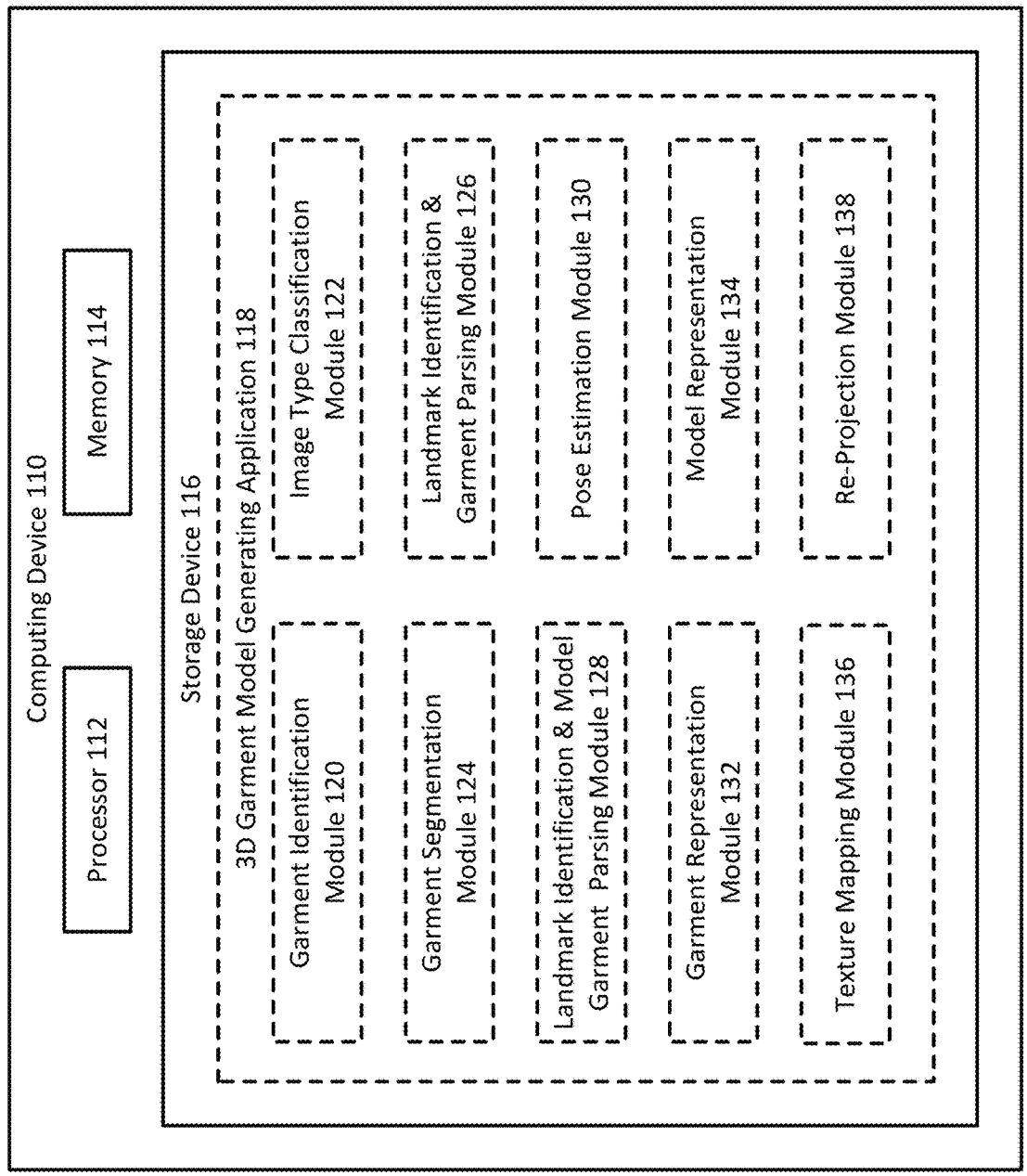
FIG. 1 schematically depicts system for automatically generating 3D virtual garment model according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise.

Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

FIG. 1 schematically depicts a system for automatically generating 3D virtual garment model according to certain embodiments of the present disclosure. As shown in FIG. 1, the system 100 includes a computing device 110. In certain embodiments, the computing device 110 shown in FIG. 1 may be a server computer, a cluster, a cloud computer, a general-purpose computer, a headless computer, or a specialized computer, which provides pose tracking services. The computing device 110 may include, without being limited to, a processor 112, a memory 114, and a storage device 116. In certain embodiments, the computing device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 112 may be a central processing unit (CPU) which is configured to control operation of the computing device 110. The processor 112 can execute an operating system (OS) or other applications of the computing device 110. In certain embodiments, the computing device 110 may have more than one CPU as the processor, such as two CPUs, four CPUs, eight CPUs, or any suitable number of CPUs.

The memory 114 can be a volatile memory, such as the random-access memory (RAM), for storing the data and information during the operation of the computing device 110. In certain embodiments, the memory 114 may be a volatile memory array. In certain embodiments, the computing device 110 may run on more than one memory 114.

In certain embodiments, the computing device 114 may further include graphics card to assist the processor 112 and the memory 114 with image processing and display.

The storage device 116 is a non-volatile data storage media for storing the OS (not shown) and other applications of the computing device 110. Examples of the storage device 116 may include non-volatile memory such as flash memory, memory cards, USB drives, hard drives, floppy disks, optical drives, or any other types of data storage devices. In certain embodiments, the computing device 110 may have multiple storage devices 116, which may be identical storage devices or different types of storage devices, and the applications of the computing device 110 may be stored in one or more of the storage devices 116 of the computing device 110.

In this embodiments, the processor 112, the memory 114, the storage device 116 are component of the computing device 110, such as a server computing device. In other embodiments, the computing device 110 may be a distributed computing device and the processor 112, the memory 114 and the storage device 116 are shared resources from multiple computers in a pre-defined area.

The storage device 116 includes, among other things, a 3D garment model generating application 118. The 3D garment model generating application 118 includes, a garment identification module 120, an image type classification module 122, a garment segmentation module 124, a landmark identification & garment parsing module 126, a landmark identification & model garment parsing module 128, a pose estimation module 130, a garment representation module 132, a model representation module 134, a texture mapping module 136, and a re-projection module 138. In certain embodiments, the storage device 116 may include other applications or modules necessary for the operation of the 3D garment model generating application 118. It should be noted that the modules 120-138 are each implemented by computer executable codes or instructions, or data table or databases, which collectively forms one application. In certain embodiments, each of the modules may further include sub-modules. Alternatively, some of the modules may be combined as one stack, for example, the landmark identification & garment parsing module 126 and the landmark identification & model garment parsing module 128 may be combined as one module, and the landmark identification & model garment parsing module 128 and the pose estimation module 130 may be combined since they share information and can be jointly trained. In other embodiments, certain modules may be implemented as a circuit instead of executable code. In certain embodiments, the 3D garment model generating application 118 may further includes a user interface for the user to monitor and adjust parameters for the 3D garment model generating application 118, and/or a scheduler to manage the images and text to be processed by different modules of the 3D garment model generating application 118, and/or garment dataset, image dataset, or other type of datasets for training one or more of the modules 120-138.

The products to be processed by the 3D garment model generating application 118 are garments provided by an ecommerce platform. Data of the garments on the ecommerce platform includes product information and images. The product information of a garment may include garment type and attribution of the garment. The garment type indicates category of the garment, such as "sweater," "shirt," "pant." The attribution of the garment characterize the garment by gender, neckline, material, color, et al, and an example of the attribution of the garment may include "women's (gender character)," "V neck (Neckline character)," "wool (material character)" and "red (color character) ." The images of the garment may include one or more garment images showing the garment only, and/or one or more model images showing the garment wore by a model. In certain embodiments, the product information and the images of the garment are stored in a corresponding product database, and the garment type, attribution, and images of the garment may be retrieved from the database using its identification, such as its stock keeping unit (SKU). In certain embodiments, the product information and the images of the garment are shown in its homepage on the ecommerce platform, the title sentence or the description portion may include the garment type and attribution, and the product information and images may be retrieved or crawled from the home page.

The garment identification module 120 is configured to retrieve or receive product information of the garment from corresponding garment entry in the product database or from the homepage of the garment in the ecommerce platform. When the garment information is stored in the product database and the database is accessible by the garment identification module 120, the garment information is directly retrieved from the product database. In certain embodiments, the garment identification module 120 includes an application programming interface (API) to query and retrieve the garment type and attribution from the product database. In one example, the product type and attributes in the product database (input) are as follows:

Garment type: Sweater
Gender: Women's
Neckline: V Neck
Material: Wool
Color: Red The output of the garment identification module 120 after querying the database is:

Garment type: Sweater
Gender: Women's
Neckline: V Neck
Material: Wool
Color: Red When the product database is not accessible, the garment identification module 120 is configured to retrieve the garment type and attributes from the homepage of the garment. In certain embodiments, the retrieved data from the homepage is a title sentence of the garment.

In other embodiments, the retrieved data from the homepage may also include other descriptions of the garment. In certain embodiments, after obtaining the title sentence of the garment, slot filling algorithm is used to obtain the type and attributes from the product description. In certain embodiments, a simple template based slot lot filling algorithm is used, where slot corresponds to named entities we like to extract, i.e., garment type and attributes. In other embodiments, more advanced algorithms, such as knowledge base population (KBP) can be used as well. The disclosure of KBP (https://nlp.stanford.edu/projects/kbp/) is incorporated herein by reference in its entirety. In one embodiment, a dictionary is maintained for a list of garment type, e.g., {sweater, shirt, skirt, T shirt, pant, . . . }, named entity of the garment type (sweater) is recognized by directly matching the nouns of the sentence with the word in the directory. The other attributes are extracted in the similar way. For example, Red is extracted as color and Wool is extracted as material.

In one example, the product title is a text of "Women's Red Color, Wool Sweater with V-neck," and the garment type and attributes determined by slot filling are:

Garment type: Sweater
Gender: Women's
Neckline: V Neck
Material: Wool
Color: Red.

The garment identification module 120 is further configured to, after obtaining the garment type and attributes, send the information to the landmark identification & garment parsing module 126, the landmark identification & model garment parsing module 128, and the garment representation module 132. In certain embodiments, the obtained garment type and attributes may not be sent to other related modules. Instead, the result is stored in a specified location and is accessible to the modules that requires the result.

Figure 2B:
FIG. 2B shows a model image containing the garment dressed on a model.
Figure 2A:
FIG. 2A shows a garment image containing garment only.
Figure 2C:
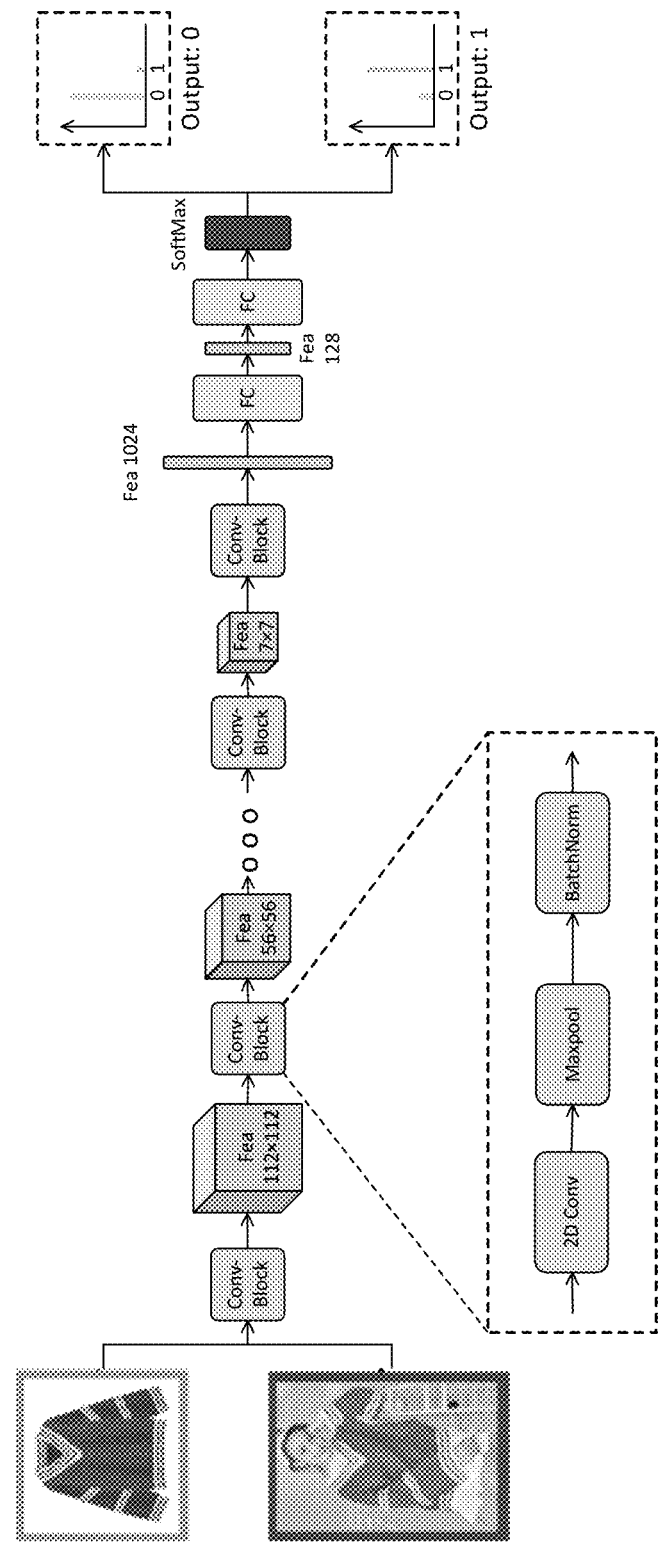
FIG. 2C schematically shows a neural network architecture for image classification according to certain embodiments of the present disclosure.

The image type classification module 122 is configured to retrieve or receive images of garment from corresponding garment entry in the product database or from the homepage of the garment in the ecommerce platform, and classify the images as garment images having the garment only or model images having the garment dressed on a fashion model. The model images may also be called garment images on model, or garment model images. In certain embodiments, the classification of the images is performed by machine learning. FIG. 2A shows a garment image containing garment only. FIG. 2B shows a model image containing the garment dressed on a model. FIG. 2C schematically shows a neural network architecture for image classification according to certain embodiments of the present disclosure. This neural network is also named as an image classifier, which may correspond to the image type classification module 122 or substantial part of the image type classification module 122. As shown in FIG. 2C, the image classifier 122 includes concatenate convolution blocks to extract semantic features from the images, such as the garment image shown in FIG. 2A and the model image shown in FIG. 2B. Each convolution block contains one 2D convolution layer, one maxpooling layer and one batchnorm layer. The extracted feature is then fed into two fully convolution layers for feature transform and generate the probability distribution with softmax activate function. The image classifier 122 is trained using pre-labeled data before processing images. In certain embodiments, input of the image classifier 122 is RGB value of image pixels, and output is probability distribution which represents the possibility of input image belonging to class 0 or 1, where 0 represents a garment image containing garment only, and 1 represents model image containing garment on a fashion model. When the image is classified, the image type classification module 122 is further configured to send the classification result and the image to the garment segmentation module 124. In certain embodiments, the image type classification module 122 is further configured to, when determining that the image is a model image, send the determination result and the model image to the pose estimation module 130.

Figures 3A, 3B:
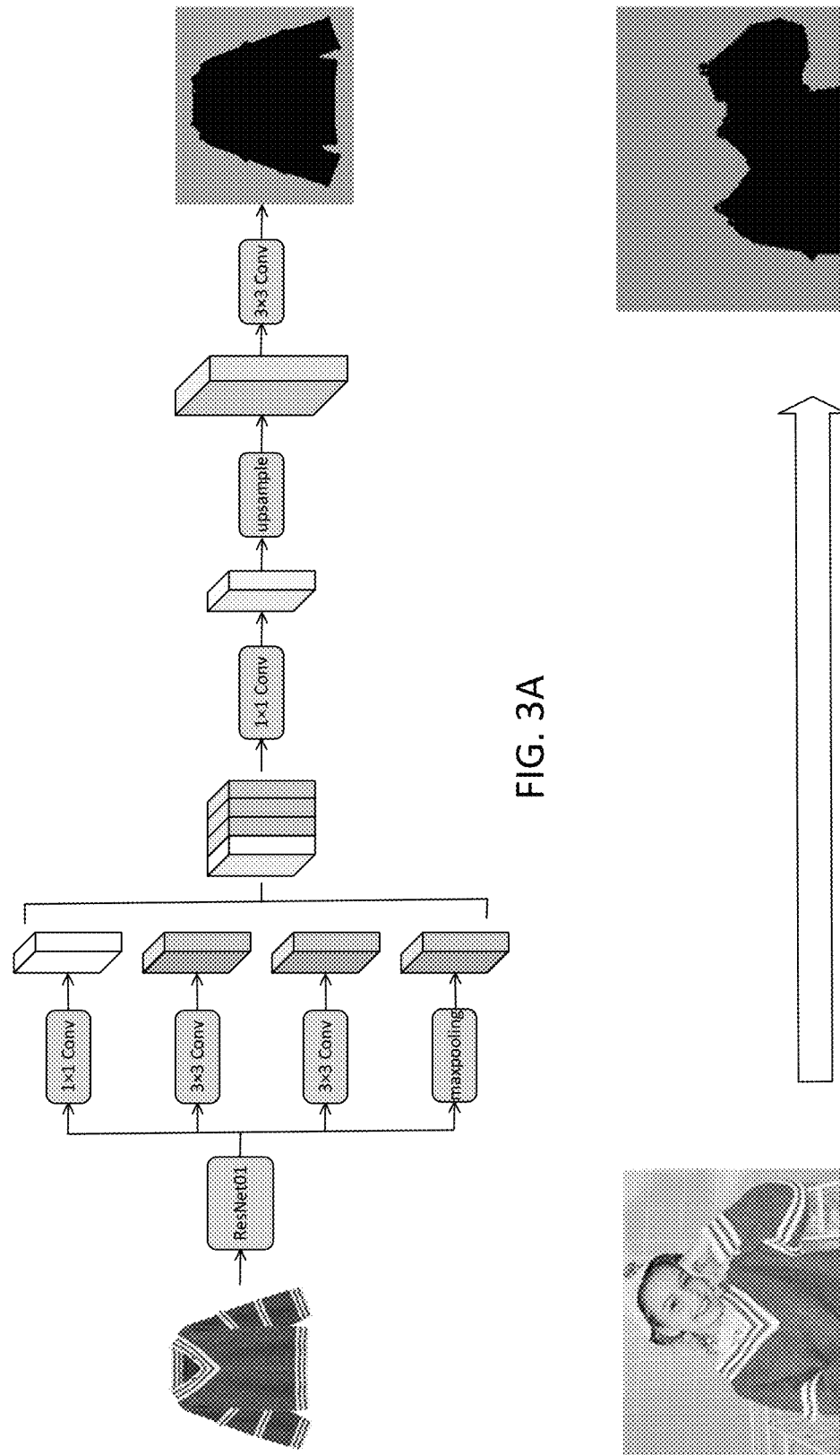
FIG. 3A schematically shows a neural network architecture for segmenting garment image according to certain embodiments of the present disclosure.
FIG. 3B schematically shows segmentation of a model image by a neural network architecture according to certain embodiments of the present disclosure.

The segmentation module 124 is configured to, upon receiving the image classification from the image type classification module 122 and the image, segment the image to obtain garment mask enclosing the garment region in the garment image or the model image. In certain embodiments, the segmentation of the images is performed by machine learning. FIG. 3A schematically shows a neural network architecture for image segmentation according to certain embodiments of the present disclosure. As shown in FIG. 3A, the neural network architecture includes an ResNet 101 as backbone network to extract shared low-level feature maps from raw image. Then, to get the global context information, an Atrous Spatial Pyramid Pool (ASPP) module, which contains multiple convolution layers and a pooling layer, is applied after last stage output of ResNet 101, followed by 1×1 convolution and up-sampling. The upsampled feature is fed into final 3×3 convolution layer and generate the segmentation mask, which is a binary 2D matrix. FIG. 3A shows segmentation of the garment image. Segmentation of the model image is similar. As shown in FIG. 3B, the processing of the model image by the segmentation module 124 outputs a mask of the garment dressed on the model. For garment image segmentation, parameters of the segmentation architecture are obtained by training using labeled garment images; and for model image segmentation, parameters of the segmentation architecture are obtained by training using labeled model images. In this embodiments, the architecture parameters used are consistent with the image classification results. In certain embodiments, the 3D garment model generating application 118 may provide two segmentation modules, one for the segmentation of garment images and one for the segmentation of the model images. The two segmentation modules have the same module structure but different parameters. After obtaining the segmentation results, which is a mask of a garment from the garment image or the model image, the garment segmentation module 124 if further configured to send the garment mask and the garment image to the landmark identification & garment parsing module 126, or send the garment mask and the model image to the landmark identification & model garment parsing module 128.

Figure 4A:
FIG. 4A schematically depicts landmark identification and garment parsing for a garment image according to certain embodiments of the present disclosure.
Figure 4A:
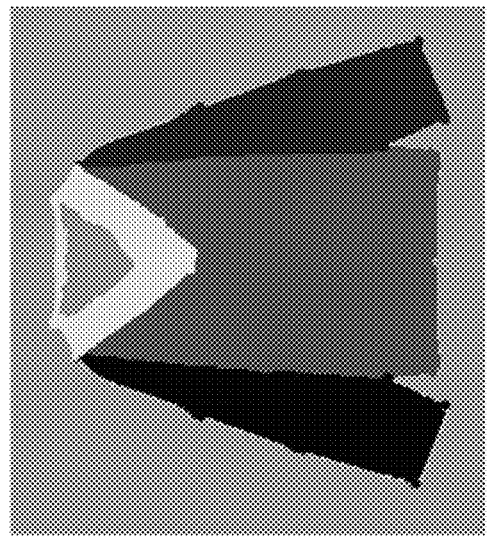
Figure 4A:
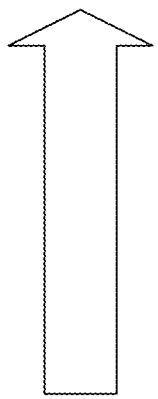
Figure 4A:
Figure 4A:
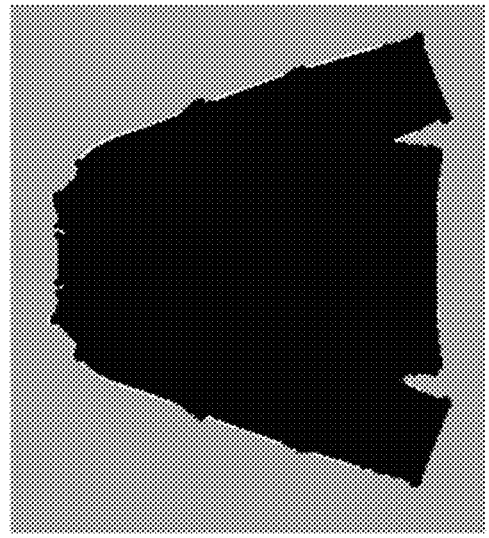

The landmark identification & garment parsing module 126 is configured to, upon receiving the garment image and the mask of the garment in the garment image from the garment segmentation module 124 and the garment type from the garment identification module 120, identify landmarks of the garment and parsing the mask into sub-masks. Each sub-mask is a part of the mask corresponding to a specific part of the garment, such as left sleeve, right sleeve, collar, torso, etc. In certain embodiments, the output of the landmark identification & garment parsing module 126 is a list of landmark points for defining the garment image and mask labels for defining the sub-mask areas or parts in the mask. In certain embodiments, the 3D garment model generating application 118 provides a predefined template for each type of garments. Each predefined template is labeled with landmark points and is segmented into different parts. When the garment type is available from the garment identification module 120, a corresponding predefined template is retrieved. The landmark identification & garment parsing module 126 performs deformable image registration of the template onto the garment mask. After the deformable registration, the garment mask then has the labeled landmark points and segmented parts. FIG. 4A schematically depicts landmark identification and garment parsing for a garment image. As shown in FIG. 4A, the input is the garment image and the corresponding mask, and the output is the landmarks of the garment and different parsed parts of the mask. In certain embodiments, the landmark points are defined by their coordinates in the garment image, and each landmark has a specific identification based on the type of the garment; the pixels in the different parsed parts may be characterized by different values. For example, the value of the pixels of the left sleeve may be characterized as 1, the value of the pixels of the right sleeve may be characterized as 2, the value of the pixels of the collar may be characterized as 3, and the value of the pixels of the torso may be characterized as 4. The values may be stored in an independent channel of the pixels, and the values may be shown by colors for view. In one example, a garment image of a long sleeve shirt is provided, and the mask of the long sleeve shirt is obtained using the garment segmentation module 124. As shown in the left side of FIG. 4B, the long sleeve shirt template is labeled with landmark points, and is divided into separate parts. After the template is deformed to fit the garment mask shown in the right side of FIG. 4B, the garment mask then is labeled with the fitted landmark points, and is divided into different parts (or sub-masks). After identifying the landmark points and parsing the mask into different parts, the landmark identification & garment parsing module 126 is further configured to send the result to the garment representation module 132.

Figure 5:
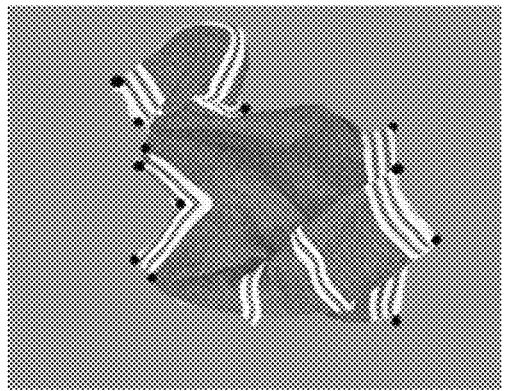
FIG. 5 schematically depicts landmark identification and garment parsing for a model image according to certain embodiments of the present disclosure.
Figure 5:
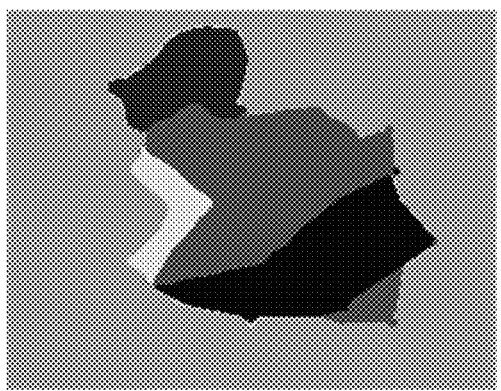
Figure 5:
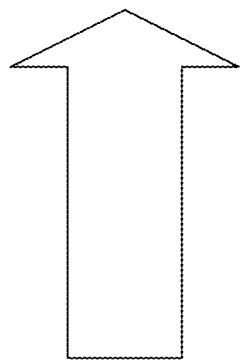
Figure 5:
Figure 5:
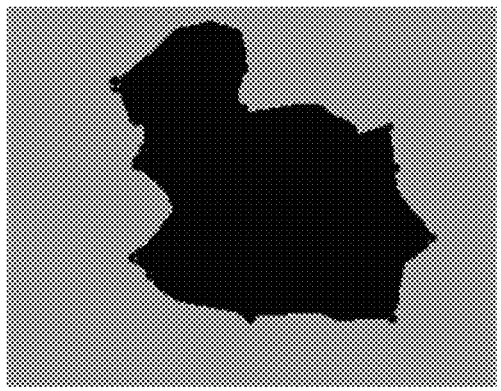

The function of the landmark identification & model garment parsing module 128 is similar to the function of the landmark identification & garment parsing module 126, except that the former processes model image using model garment template, while the latter processes garment image using garment template. Specifically, the landmark identification & model garment parsing module 128 is configured to, upon receiving the model image and the mask of the model garment in the model image from the garment segmentation module 124 and the garment type from the garment identification module 120, identify landmarks of the model garment and parsing the mask into sub-masks. Each sub-mask is a part of the mask corresponding to a specific part of the garment, such as left sleeve, right sleeve, collar, torso, etc. In certain embodiments, the output of the landmark identification & model garment parsing module 128 is a list of landmark points for defining the model image and mask labels for defining the sub-mask areas or parts of the mask. In certain embodiments, the 3D garment model generating application 118 may provide a predefined template with different poses for each type of garments. In other embodiments, the template may not include poses, and the landmark identification & model garment parsing module 128 may use the template corresponding to the garment only as a starting point, and fitting from the garment template to the model garment mask may be more difficult. As described above, each predefined template is labeled with landmark points and is segmented into different parts. When the garment type is available from the garment identification module 120, a corresponding predefined template is retrieved. The landmark identification & model garment parsing module 128 performs deformable image registration of the template onto the model garment mask. After the deformable registration, the model garment mask then has the labeled landmark points and segmented parts. FIG. 5 schematically depicts landmark identification and model garment parsing for a model image. As shown in FIG. 5, the input is the model image and the corresponding mask, and the output is the landmarks of the model garment and different parsed parts of the mask. In certain embodiments, the landmark points are defined by their coordinates in the model image, and each landmark mark has a specific identification based on the type of the garment; the pixels in the different parsed parts may be characterized by different values, for example, 1 for left sleeve, 2 for right sleeve, 3 for collar, and 4 for torso. In one example, a model image of a long sleeve shirt is provided, and the mask of the long sleeve shirt is obtained using the garment segmentation module 124. As shown in FIG. 5, the right sleeve part of the garment is covered on the body part, and the overlap indicates the pose of the model in the model image. After identifying the landmark points and parsing the mask into different parts, the landmark identification & model garment parsing module 128 is further configured to send the result to the garment representation module 132.

Figure 6:
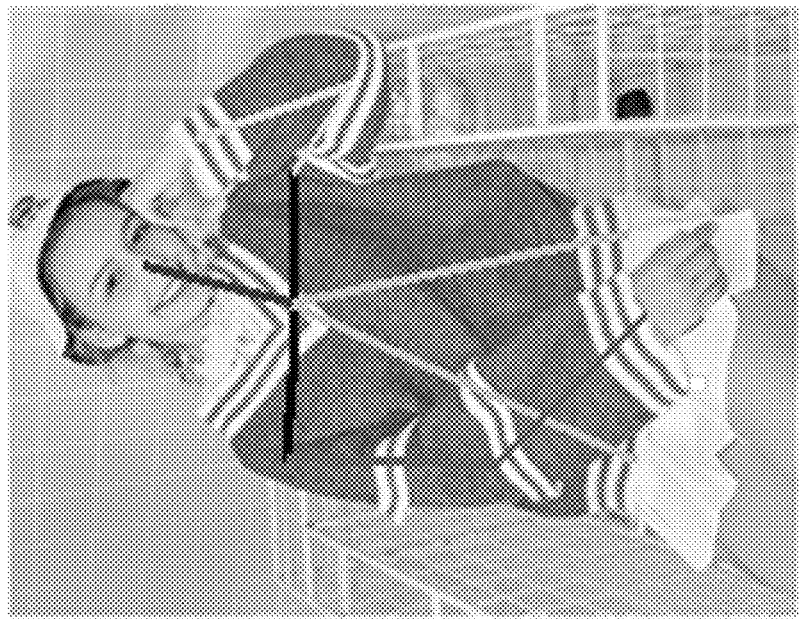
FIG. 6 schematically depicts pose estimation of a model image according to certain embodiments of the present disclosure.
Figure 6:
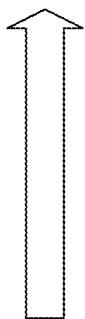
Figure 6:

The pose estimation module 130 is configured to, upon receiving the classification result (that the image is a model image) and the model image from the image type classification module 122, estimate pose of the model in the model image. In certain embodiments, the pose is estimated immediately after the classifier determines that the image is a model image. In certain embodiments, the pose estimation neural network is jointly trained with garment landmark identification as they share information. As shown in FIG. 6, the input of the pose estimation module 130 is the garment on the fashion model, and the output is the skeleton of the fashion model estimated from the input image, which may be a list of joint points. There are many different existing techniques to estimate human body poses of the fashion model in images. In certain embodiments, pose machines (http://www.cs.cmu.edu/~vramakri/poseMachines.html) may be used by the pose estimation module 130, where spatial interactions among multiple parts and information across parts of different scales are incorporated for pose estimation. In certain embodiments, OpenPose algorithm may be used by the pose estimation module 130, where a deep learning based algorithm is used to jointly learn part locations and their association (https://arxiv.org/abs/1611.08050). After obtaining the pose, the pose estimation module 130 is further configured to send the estimated pose to the re-projection module 138.

The garment representation module 132 is configure to, upon receiving the landmark points from at least one of the landmark identification & garment parsing module 126 and/or the landmark identification & model garment parsing module 128, and the garment type from the garment identification module 120, fit the garment to a specific garment template for 3D modeling. The garment template is provided by the 3D garment model generating application 118 based on the specific garment type. In certain embodiments, the garment template used herein is a 3D garment template. The input of the garment representation module 132 includes the garment type, such as "women's sweater," and the landmarks of the garment, such as coordinates of the "left neckline point, right neckline point, center neckline point, left shoulder point, right shoulder point, left cuff out point, left cuff in point, right cuff out point, right cuff in point, left armpit point, right armpit point, left top hem point, right top hem point," where the coordinates may relate to the pre-defined origin of the garment. The output of the garment representation module 132 includes a series of parameters of modeling the specific garment: (1) chest girth, neck girth, raglan, armhole depth, body length, natural waist girth, back waist length, cross back, hip girth, sleeve length, center back neck to cuff length, upper arm girth, wrist girth and elbow girth; (2) a set of vertices and surfaces representing the 3D model of the garment.

In certain embodiments, a combination of image processing and geometry computation can be used to compute all or a subset of the parameters. For example, to compute the sleeve length, we can simply compute the distance between the left shoulder point and the left cuff out point if the sleeve is flattened in the image. If not flattened as in the images of fashion models wearing the garment, a contour tracing algorithm can be used to trace the contour of the garment from shoulder point to cuff point. In another example, the chest girth can be computed using simple geometry. We can fit an ellipse to the horizontal section of a human torso. Then, the distance between the two armpit points is the length of the major axis. The length of the minor axis can be estimated based on the major axis and common body shape prior. Then the chest girth can be computed as the perimeter of the fitted ellipse. In certain embodiments, when several images of the garment are available, the garment representation module 132 may take an average, median, or weighted average from the images to compute the parameters. In certain embodiments, when both garment image and model image are available, the garment representation module 132 may take more weight from the garment images to compute the parameters.

Kindly note that not all the measurements can be computed from the image, but not all of them are needed for modeling either. The parameters have redundancy. Also note that the aforementioned measurements are all in pixels. To obtain the real world measurement, we need the user to specify a scale (e.g., a simple real world length of sleeve is enough to compute the scale from image space to world space).

Figure 7:
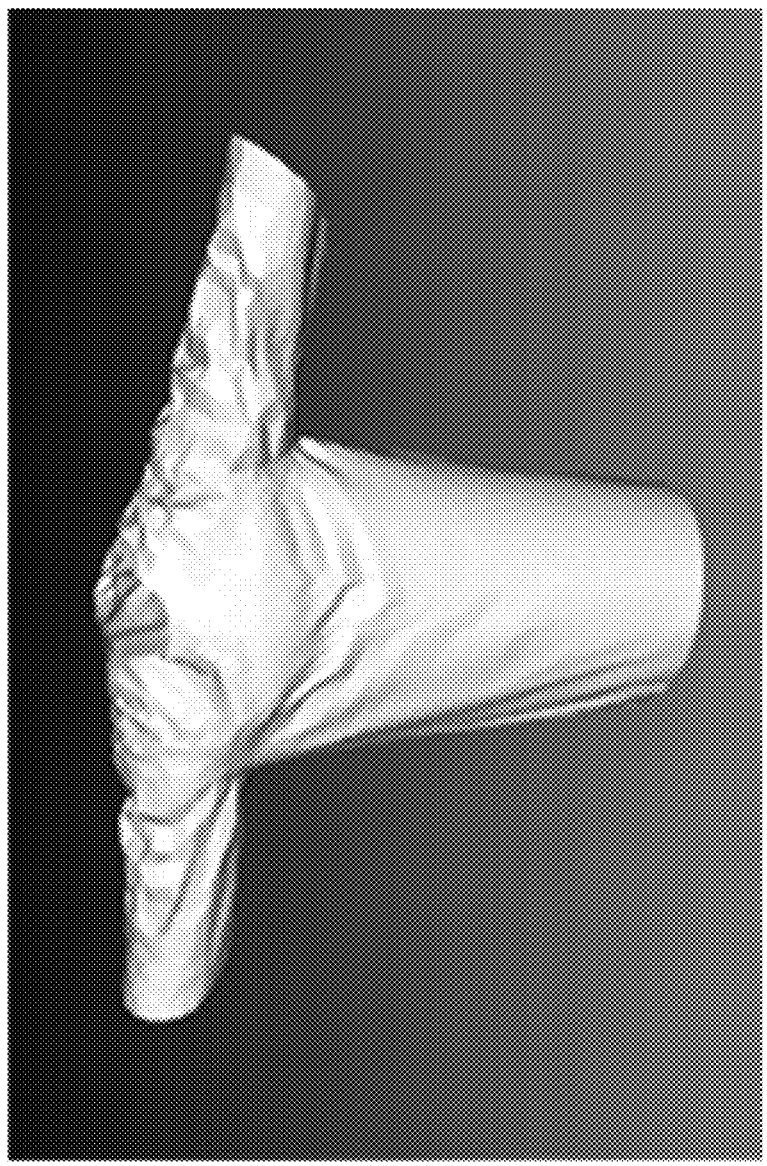
FIG. 7 schematically shows a garment representation according to certain embodiments of the present disclosure.

The garment representation module 132 is configured to use these parameters to create a 3D model of the garment. One approach is to use these parameters to create 2D pattern pieces and then create a 3D model from these 2D pieces in 3D space. This process mimics the real process of garment design. Another approach is to use a template garment mesh defined for this type of garment, and then deform the template mesh model in 3D space according to the size measurements. FIG. 7 schematically shows a garment representation according to certain embodiments of the present disclosure, where the representation is a long sleeve shirt. After the garment representation is obtained, the garment representation module 132 is further configured to send the representation to the model representation module 134.

The model representation module 134 is configured to, upon receiving the garment representation in 3D space, align the landmark points (joints) of the model representation to the joints of a human body model. The human body model is provided by the 3D garment model generating application 118. The human body model is established based on a set of parameters. In certain embodiments, the human body model is defined using the method by Li et al. (Jituo Li Et al., Fitting 3D garment models onto individual human models, Computers & Graphics, Volume 34, Issue 6, December 2010, Pages 742-755), which is incorporated herein by reference in its entirety. After the human body model is established, the model representation module 134 is configured to register the garment representation to the human body model by aligning the joints of the human body model and the garment template. In certain embodiments, different body shapes can be fit as well, such as using the method of Brouet el al. (Remi Brouet et al., Design preserving garment transfering, ACM Transactions on Graphics, Association for Computing Machinery, 2012, SIGGRAPH 2012), which is incorporated herein by reference in its entirety. The input of the model representation module 134 is pre-selected human body parameters and the estimated garment parameters, and the output is the garment and body alignment. At the time, the 3D garment model is obtained and ready for being viewed by users. In certain embodiments, after the alignment and obtaining the 3D garment model, the model representation module 134 is further configured to send the model representation (the human body model with the aligned garment on the human body model) to the texture mapping module 136 for providing texture to the 3D garment model and/or to the re-projection module 138 for refining the 3D garment model. In certain embodiments, the 3D garment model needs further refinement by the re-projection module 138, and thus is named a preliminary 3D garment model.

Figure 8:
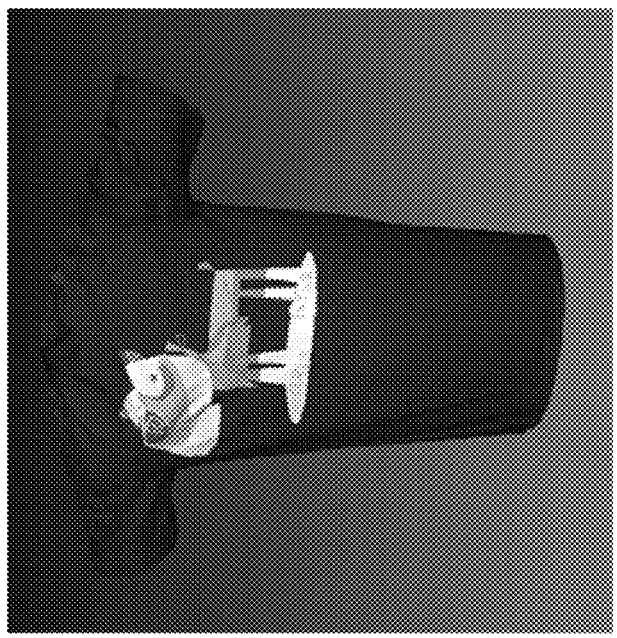
FIG. 8 schematically depicts texture mapping from 2D flattened texture to 3D texture model according to certain embodiments of the present disclosure.
Figure 8:
Figure 8:
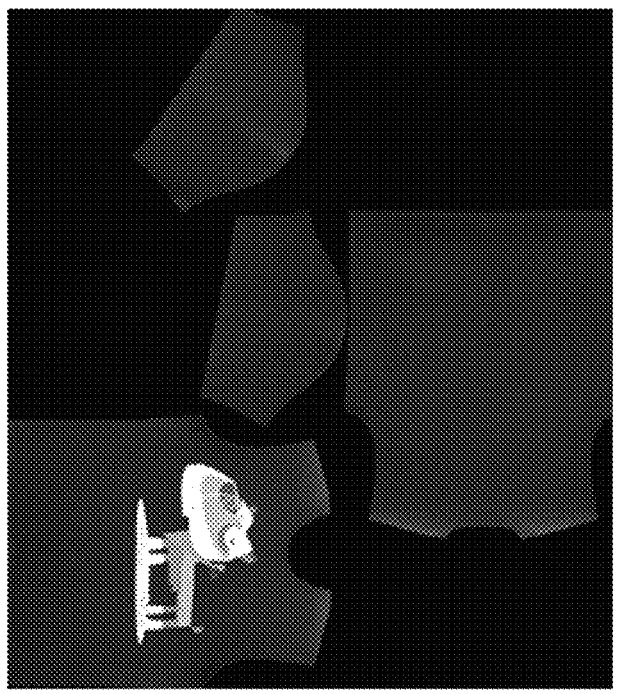

The texture mapping module 136 is configured to, upon receiving the model representation of the garment, the original image containing the garment, and the parsing result, map the parsed garment pieces to a flattened 2D texture image. Each parsed piece is mapped onto the 2D reference texture image shown in the left side of FIG. 8. In certain embodiments, deformation is required for mapping the parsed pieces to the 2D texture image. When the 2D texture image is created, the texture mapping module 136 is further configured to map the 2D texture image to the 3D model representation shown in the right side of FIG. 8. At the time, the 3D garment model is obtained with texture. In certain embodiments, the reference texture is obtained from the garment template, and the garment template comes with a 3D model and a 2D flattened reference mesh. In certain embodiments, in each of the re-projection cycles, the intermediate 3D garment models are processed to have the texture, and the texture information is used to help refine the model. In certain embodiments, texture of the 3D garment model is performed according to Xu et al. (Xu et al., 3D Virtual Garment Modeling from RGB Images, arXiv: 1908.00114v1, 31, Jul. 2019), which is incorporated herein by reference in its entirety.

The re-projection module 138 is configured to, upon receiving the preliminary 3D garment model from the model representation module 134 (aligned 3D garment and predefined human body) or the textured preliminary 3D garment model from the texture mapping module 136, the original model image with garment on a fashion model, and the pose from the pose estimation module 130, or the original garment image with garment only, and the landmarks from the landmark identification and garment parsing module 126, refining the preliminary 3D garment model with or without texture. Specifically, the re-projection model 138 is configured to fit the preliminary 3D garment model to a pose determined by the pose estimation module 130 so as to obtain a 2D projection of the garment, compare the 2D projection of the garment with the 2D model image (which is used for determining the pose), and use the difference in the comparison to improve the 3D garment model estimation. The improvement may be performed by adjusting human body model parameters, pose estimation parameters, and garment construction parameters, or by adjusting parameters of garment landmark identification parameters, garment parsing parameters, and garment construction parameters. In certain embodiments, the process of re-projection, comparison, and parameter adjustment is an iterative process, the process is performed iteratively until the difference between the 2D source image (model image) and the re-posed 2D projection image from the estimated 3D garment model is minimum or within a difference range. In certain embodiments, the refine process using the re-projection is determined to be final when the difference between the 2D source image and the 2D projected is less than a threshold. In certain embodiments, the threshold is 20% difference. In certain embodiments, the threshold is 10% difference. In certain embodiments, the threshold is 5% difference. In certain embodiments, the threshold is 1% difference. The final output is an adjusted or a final 3D garment model. In certain embodiments, the re-pose of the 3D garment model to the estimated poses determined by the pose estimation module 130 is performed using the method described in Li et al. (Jituo Li et al., Fitting 3D garment models onto individual human models, Computers & Graphics, Volume 34, Issue 6, December 2010, Pages 742-755).

As described above, the re-projection can be performed in regard to a model image utilizing pose information, or be performed in regard to a garment image utilizing landmarks.

For a model image, the pose of the 2D model is estimated from the model image, and the corresponding 2D projection is performed by positioning the 3D human body model in the pose of the 2D model. For a garment image, pose is not available and re-projection can still be done similarly. Specifically, in order to iteratively make the improvement, the 3D garment model can be re-projected to the 2D garment shape in the same way as the 3D garment model being re-projected to the projected image considering the pose. In this case, we re-project the 3D garment model into 2D space according to the landmarks and parsing result. For example, we may take front view of the 3D garment model and compare it against the input front view garment image. This may be especially useful if we have multiple input garment images taken from different views (e.g., front, back, left side, right side . . . ) as described below, where we then may do a few comparisons in one iteration.

In certain embodiments, the image of the garment includes one or more garment images each having the garment only, and one or more model images each having the garment dressed on a model, such as a two dimensional (2D) model. When the image of the garment includes multiple images, the 2D projected image may also be one or more. The number of the 2D projected image may equal to or less than the number of the images of the garment. The comparison is performed between one of the 2D projected images and a corresponding one of the images of the garment. For example, if one of the images of the garment is a front view image, the corresponding 2D projected image for comparison is also a front view of the garment projected from the preliminary 3D garment model. Multiple images can be compared in one round of refinement. When the images of the garment include multiple garment images: front view image, back view image, left side view image, and right side view image, the corresponding 2D projected images may also include multiple projected images accordingly: front view 2D projected image, back view 2D projected image, left side view 2D projected image, and right side view 2D projected image. The corresponding image-projected image pairs are compared, and the comparison results are combined for refining the 3D garment model. When both garment images and model images are available, the re-projection refinement may combine the comparison results in regard to both the garment images and the model images together.

In the above description, the images are processed, and the results are passed from one model to the other. In certain embodiments, the 3D garment model generating application 118 further includes a scheduler to coordinates the process. For example, when the application 118 is in operation, the application retrieved the images and placed the images in the memory 114, the scheduler then instructs different modules to process the images, and stores the processed result in the memory 114 in regard to the corresponding images. The processing result of one module is accessible by the other modules. The processing result may include the image type, the mask of the garment, the landmark points of the garment, the parsed pieces of the garment, the pose of the model in the model image, the garment representation, the provided human body model, the texture of the parsed pieces, etc. Those processing results are then combined to provide the refined 3D garment model for user's view. Because the final result is a 3D garment model, the user can view the garment from different angles, rotate the 3D garment model, so as to get to know the garment well before determining whether to purchase the garment or not.

Further, as described above, the application 118 provides templates (both 3D templates and 2D reference meshes) for the garment representation module 132 and the landmark identification modules 126 and 128, and provides human body model to the model representation model 134. Those information may be stored to the application 118 in advance, or stored in a database that is accessible to the application 118.

Figure 9:
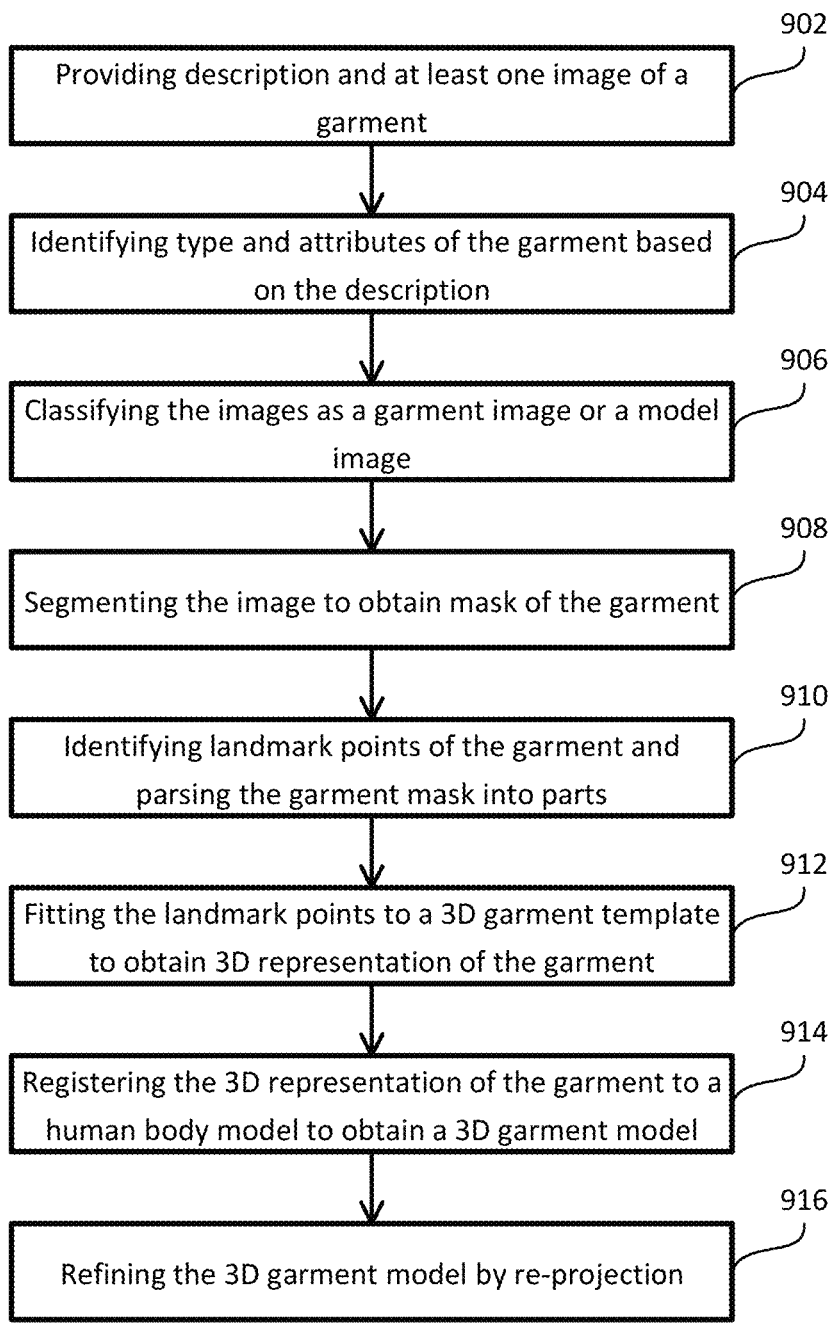
FIG. 9 schematically depicts a method for generating a 3D garment model according to certain embodiments of the present disclosure.

FIG. 9 schematically depicts a method for generating a 3D garment model according to certain embodiments of the present disclosure. In certain embodiments, the method is implemented by the computing device 110 shown in FIG. 1. It should be particularly noted that, unless otherwise stated in the present disclosure, the steps of the method may be arranged in a different sequential order, and are thus not limited to the sequential order as shown in FIG. 9.

In certain embodiments, description and images of a garment and results of processing the description and images are passed sequentially from one module to another. In other embodiments, the description and images of a garment and the processing are loaded or stored in the memory 114 during operation of the application 118, and a scheduler may be used to coordinate the operation of the modules. The following method 900 is described by using the scheduler to coordinate the operations of the modules, but the disclosure is not limited thereto.

In certain embodiments, the 3D garment model generating application 118 provides garment template (and associated 2D reference meshes) for each type of garment. Referring to the left side of FIG. 4B, each garment template shows the shape of the garment, the garment template is divided into different parts or portions such as a left sleeve, a right sleeve, a collar, and a torso of a long sleeve shirt template. The template also includes landmark points of the garment, which are used to characterize the different portions of the template. The different parts are labeled differently and can be shown with different colors based on the labels.

In certain embodiments, the 3D garment model generating application 118 provides 3D garment template for each type of garment. The 3D garment template are parameters for generating a 3D garment model. For example, for a long sleeve shirt, the 3D garment template may include parameters of chest girth, neck girth, raglan, armhole depth, body length, natural waist girth, back waist length, cross back, high girth, sleeve length, center back neck to cuff length, upper arm girth, wrist girth, elbow girth, and a set of vertices and surfaces representing the 3D garment model. When the landmark points of a target garment is fit with the 3D garment template, the parameters are updated. Accordingly, a new 3D garment model can be generated based on the updated parameters.

In certain embodiments, the 3D garment model generating application 118 provides different human body models. The human body models may be defined by the gender, the height, the weight, the age, etc. In certain embodiments, the 3D garment model generating application 118 may define several standard human body models, such as a child body model, a girl body model, a boy body model, a woman body model, and a man body model as a starting point, and parameters of those models can be adjusted when necessary. The human body model is three-dimensional, and joints are labeled in the 3D human body model. The joints of the 3D human body model may be defined to correspond with landmark points of garments, and the joints/landmark points correspondence can be used to dress the garment onto the human body model.

Figure 4B:
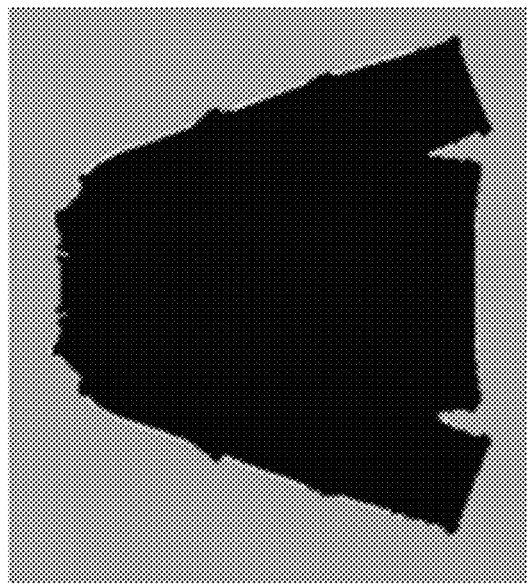
FIG. 4B schematically depicts deformation of a garment template to garment mask according to certain embodiments of the present disclosure.
Figure 4B:
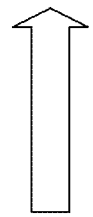
Figure 4B:
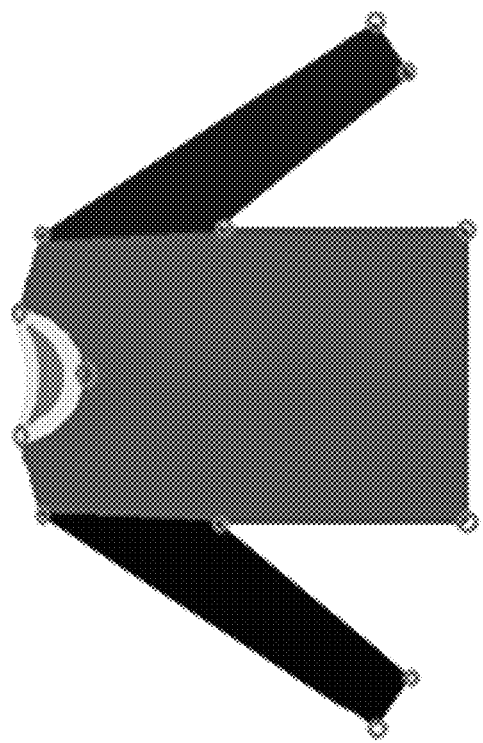

Referring to the left side of FIG. 4B, each template shows the shape of the garment, the garment template is divided into different parts or portions such as a left sleeve, a right sleeve, a collar, and a torso of a long sleeve shirt template. The template also includes landmark points of the garment, which are used to characterize the different portions of the template. The different parts are labeled differently and can be shown with different colors based on the labels.

As shown in FIG. 9, at procedure 902, description of a garment and images of a garment are provided. Specifically, the scheduler may retrieve the description or images of the garment from a product database using the identification of the garment, or extract description (for example title of the garment) and images from homepage of the garment. Alternatively, the scheduler may instruct the garment identification module 120 to retrieve or extract the garment description, and instruct the image type classification module 122 to retrieve or extract the images of the garment. In certain embodiments, the retrieved or extracted description and images of the garment is stored in a dedicated part of the memory 114 for being processed. In certain embodiments, the description and the images may be defined with a garment entry, for example "garment 1," and the description, the images and the following processing are all stored in the same garment entry. In certain embodiments, a plurality of garments is processed in parallel, and each of the garment is labeled with a specific garment entry.

At procedure 904, upon receiving the description of the garment, the scheduler loads the garment identification module 120 to the memory 114 and executes the module. The garment identification module 120, when being executed, identifies type and attributes of the garment. The type and attributes of the garment is stored in the entry of "garment 1" in the memory 114. In certain embodiments, after determining the type and the attributes of the garment, the description may be deleted from "garment 1."

At procedure 906, upon receiving the images of the garment, the scheduler loads the image type classification module 122 to the memory 114 and executes the module. The image type classification module 122, when being executed, classifies the image as a garment image or a model image, where the garment image contains garment only, and the model image contains the garment dressed on a model. The image type classification module 122 then stores the classification of the image, either "garment image" or "model (garment) image" to the entry "garment 1" corresponding to the image being processed.

At procedure 908, upon classifying the image, the scheduler loads the garment segmentation module 124 to the memory 114 and executes the module. The garment segmentation module 124, when being executed, segments the image based on the classification of the image to obtain a mask of the garment. Specifically, when the image is the garment image, the garment segmentation module 124 identifies the garment region from the garment image; when the image is the model image, the garment segmentation module 124 may uses a bounding box to enclose the garment, and identify the garment region from the bounding box. The identified garment is defined with a mask. The garment segmentation module 124 then stores the mask together with the image in the entry "garment 1."

At procedure 910, upon obtaining the mask of the garment, the scheduler loads the landmark identification & garment parsing module 126 and executes the module when the image is classified as a garment image, and loads the landmark identification & model garment parsing module 128 and executes the module when the image is classified as a model image (or namely model garment image, which contains the garment dressed on a model).

When the image is the garment image, the landmark identification & garment parsing module 126 chooses a 2D garment template based on the type of the garment, deforms the 2D garment template to fit the mask of the garment derived from the garment image. After the deformation of the 2D garment template, the landmarks points and the different parts also move or deform to fit the mask. Then the landmark identification & garment parsing module 126 labels the mask with the moved landmark points and the deformed garment parts.

When the image is the model image, similarly, the landmark identification & model garment parsing module 128 chooses a 2D garment template based on the type of the garment, deforms the 2D garment template to fit the mask of the garment derived from the garment image. After the deformation of the 2D garment template, the landmarks points and the different parts also move or deform to fit the mask. Then the landmark identification & model garment parsing module 126 labels the mask with the moved landmark points and the deformed garment parts. In certain embodiments, because the 2D garment template is very different from the mask of the garment dressed on the model, the deformation is inaccurate. To improve the landmark identification and parsing, in certain embodiments, the landmark identification & model garment parsing module 128 may use the pose estimation of the model garment to aid the process. For example, if it is determined by the pose estimation module 130 that the right sleeve part is covered on the body part, the landmark identification and model garment parsing module 128 would fold the right sleeve part of the 2D garment template onto the body part of the 2D garment template, and then deforms the 2D garment template to the mask. In certain embodiments, the 3D garment model generating application 118 may also provide multiple 2D garment templates corresponding to different poses of a type of garment. Therefore, a suitable 2D garment template can be chosen based on the type of the garment and pose of the model image for landmark points identification and parsing.

After this procedure, the landmark identification & model garment parsing module 128 stores the landmark points and the parsed parts to the entry "garment 1."

At procedure 912, upon obtaining the landmark points and the parsed parts of the garment, the scheduler loads the garment representation module 132 and executes the module. The garment representation module 132, when being executed, chooses a 3D garment template according to the type of the "garment 1," fits the landmark points to the 3D garment template, and uses the fitted and calculated parameters to generate a 3D model or a 3D representation of the garment. The garment representation module 132 stores the parameters and/or the 3D garment model in the "garment 1" related to the image of the garment.

At procedure 914, upon obtaining the 3D garment model, the scheduler loads the model representation module 134 and executes the module. The model representation module 134, when being executed, chooses a human body model, and registers the 3D garment model to the human body model. In certain embodiments, the model representation module 134 performs the registration by aligning the landmark points of the 3D garment model with the corresponding joints of the human body model. In certain embodiments, the human body model and the 3D garment model are represented by the numerical parameters, and the alignment of the landmark points with the joints can be completed with mathematical calculation. After the alignment, the model representation model 134 then generates the 3D garment model based on those parameters, where the garment is dressed on the human model in a 3D representation.

In certain embodiments, the scheduler may further instruct the texture mapping module 136 to map the texture of the garment onto the 3D garment model. Because the garment is parsed into different parts, the texture mapping module 136 may characterize each part by its respective material and color. The texture mapping module 136 then maps the material and the color to the corresponding parts in the 3D garment model, so as to obtain a texture mapped 3D garment model. In certain embodiments, the texture mapping module 136 maps the texture to every 3D garment model, including the generated 3D garment model in the above step 914, the intermediate 3D garment model during refinement in the following step 916, and the refined, final 3D garment model in the following step 916, where the texture information may be used to assist the refinement process. In other embodiments, the texture mapping module 136 may only maps the texture to the refined, final 3D garment model.

At procedure 916, the scheduler loads the re-projection module 138 to the memory 114 and executes the module. The re-projection module 138, when being executed, refines the 3D garment model iteratively to obtains the refined, final 3D garment model.

When the image of the garment related to the re-projection is a model image, a pose of the model in the model image is estimated by the executed pose estimated module 130 before re-projection. Specifically, the scheduler loads the pose estimation module 130 to the memory 114 after classifying the image as a model image and before the step of re-projection, and executes the module. The input for the pose estimation module 130 is the model image having the garment dressed on the model, and the output is the skeleton of the fashion model estimated from the input image, which may be a list of joint points as shown in the right side of FIG. 6. In certain embodiments, the pose estimation module 130 performs pose estimation on an image whenever the image is determined to be a model image. In other embodiments, the pose estimation module 130 may perform pose estimation after the model representation module 134 obtains the 3D garment model.

When the 3D garment model and the estimated pose of the model in the model image are available, the executed re-projection module 138 adjusts the pose of the 3D garment model to the pose estimated by the pose estimation module 130 from the model image, generates a 2D projection of the 3D garment model with adjusted pose, compares the generated 2D projection with the original model image to obtain the difference, and uses the difference as feedback to improve the 3D garment model. The improvement includes at least one of adjusting human body model parameters via the model representation module 134, adjusting pose estimation parameters via the pose estimation module 130, adjusting landmark identification and model garment parsing parameters via the landmark identification and model garment parsing module 128, and adjusting garment construction parameters via the garment representation module 132 and model representation module 134. After adjusting the parameters, the pose estimation module 130 estimates a new pose, the landmark identification and model garment parsing module 128 re-identifies landmarks and parses the mask into sub-masks, the garment representation module 132 generates a new 3D garment representation, and the model representation module 134 generates a new 3D garment model based on the new 3D garment representation. The re-projection module 138 then performs 2D projection of the 3D garment model using the new pose, and compares the new 2D projection with the original model image. The above process can be performed iteratively for a predetermined number of cycles, such as 3-5 times, or be performed iteratively until the difference between the current 2D projection and the original model image is less than a predetermined threshold. In certain embodiments, the re-projection includes adjusting garment representation parameters; generating an updated 3D garment representation; generating the updated 3D garment model (by registration to the human body model); and again, re-projecting the 3D garment model to obtain 2D projected image for comparison.

In certain embodiments, when the image of the garment only includes a garment image but no model image, the pose estimation step is not necessary, but the following re-projection can still be done with regard to the one or more garment images. In certain embodiments, when there is no model image and only a garment image exists, the re-projection module will project the 3D garment model to the 2D garment space accordingly using the estimated garment landmarks and parsing result. With new landmarks and new parsing result, and thus new 3D garment model, similar iterative process can be performed to improve the 3D garment model result. In certain embodiments, the re-projection process includes adjusting garment representation parameters; generating an updated 3D garment representation; generating the updated 3D garment model with textures; and again, re-projecting the 3D garment model to obtain 2D projected image for comparison.

In certain embodiments, when the garment has multiple images, all or most of the images are processed by re-projection and comparison accordingly, and the result from the multiple images may be averaged or weighted to obtain an accurate 3D garment model. In certain embodiments, when the multiple images include at least one model image and at least one garment image, the re-projection and comparison result in regard to the at least one model image may place more weight in adjusting corresponding parameters.

In certain embodiments, for a process from an original image (a model image or a garment image), the parameter adjustment after each re-projection may include changing parameters of the 3D garment model, such that a current re-projected 2D image matches the original image better than an immediate previous re-projected 2D image does.

In certain embodiments, re-projection and comparison result can be used to choose better intermediate result from previous modules. For example, the garment landmark identification can generate the best estimated result—a set of landmarks according to its optimization goal, however, instead of one result, it may generate more than one set of landmarks, say top three best estimations. And we may determine that the one with the least re-projection error as the final one we use for the final garment model generation. For example, for a process using an original image (a model image or a garment image), the parameter adjustment after each re-projection may include changing parameters of at least one of the landmark identification and garment parsing module 126, the landmark identification and model garment parsing module 128, and the pose estimation module 130, the model representation module 134, and the texture mapping module 136. In certain example, a few different sets of parameters may be used for at least one of the above modules 126-136, each set corresponds to a 2D re-projection, and the one set of parameters with the best match between the 2D re-projected image and the original image are kept for that module. In one example, sleeve length is adjusted with different parameters, and the one sleeve length is kept when its corresponding 2D-reprojected image matches the original image the best. Then shirt length is adjusted with different parameters, and the one shirt length is kept when its corresponding 2D-reprojected image matches the original image the best. By adjusting those important parameters related to such as the sleeve length and the shirt length, the re-fined 3D garment model can be obtained.

Figure 10:
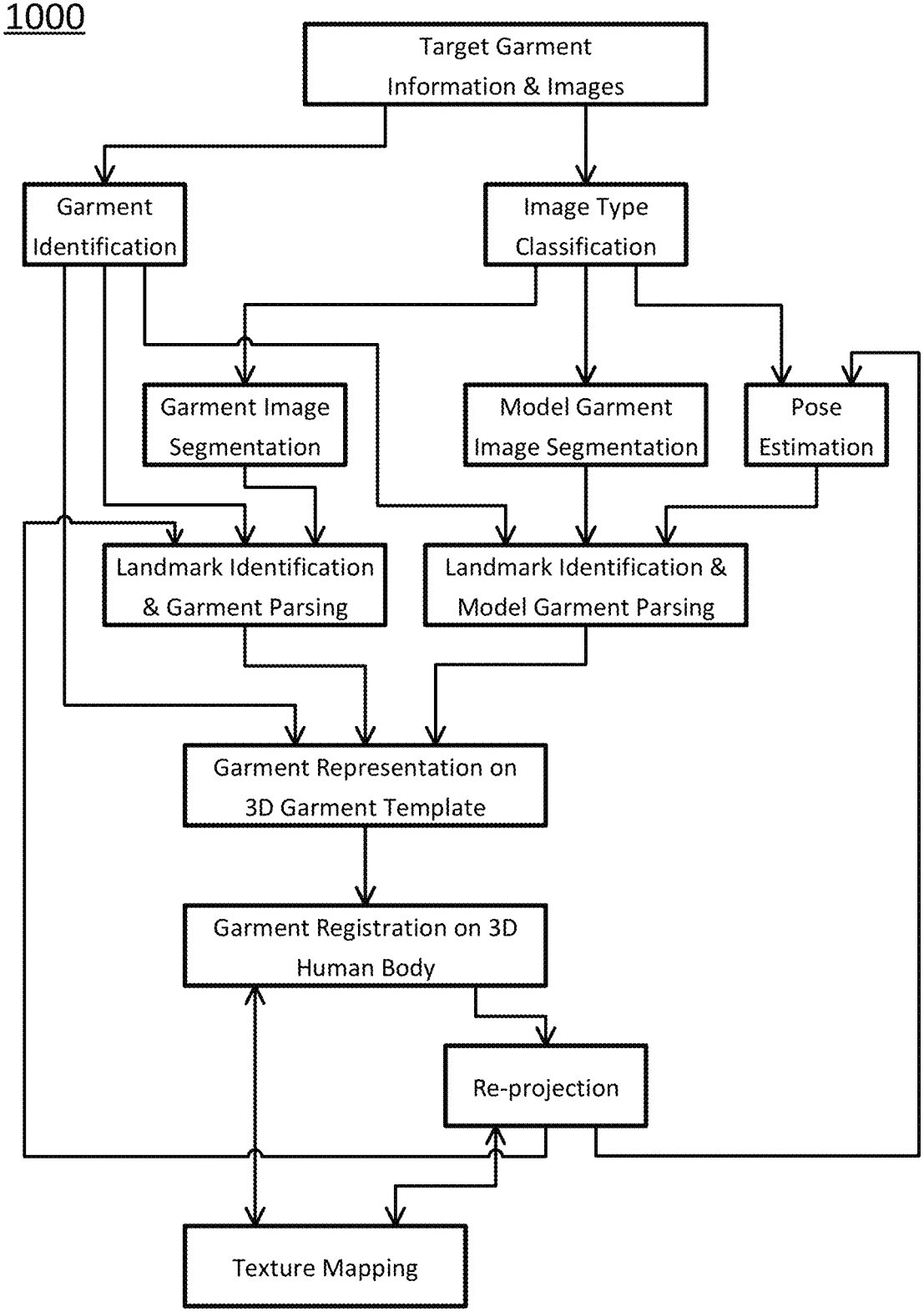
FIG. 10 schematically depicts a workflow of automatically generating a 3D garment model according to certain embodiments of the disclosure.

FIG. 10 shows a workflow 1000 according to certain embodiments of the disclosure. As shown in FIG. 10, for a target garment, garment information and garment images are retrieved. Garment identification extracts type and attributes of the target garment. Image classification classifies each of the images as a garment image or a model image. The garment image contains target garment only, which could be a front view, a side view, or a back view of the target garment; and the model image contains target garment dressed on a model, and the model may have a specific pose. The pose of the model image can be estimated by pose estimation.

When the image is the garment image, garment image segmentation gives a mask for the target garment. A garment template is provided based on the type of the target garment, and the garment template contains landmark points and parsed parts. The garment template is deformably registered to the mask of the target garment image, so as to obtain landmark points and parsed parts of the target garment.

When the image is the model image, garment image segmentation gives a mask for the target garment, where the mask also indicates the pose of the model. A garment template (either with or without pose) is provided based on the type of the target garment, and the garment template contains landmark points and parsed parts. The garment template is deformably registered to the mask of the target garment image, so as to obtain landmark points and parsed parts of the target garment.

When the landmarks and the parsed parts from one or more images are available, those information are used for garment representation. A 3D garment template is provided based on the type of the garment, and the garment representation is performed by fitting the landmark points to landmark points of the 3D garment template. The garment representation is actually a set of parameters that can be used to generate a 3D representation of the target garment.

A 3D human body model is provided, and the 3D representation of the target garment is registered to the 3D human body model. The registration is performed by aligning the landmark points of the garment in the 3D representation to the joints of the 3D human body model, so as to "dress" the target 3D garment model on the human body.

The generated 3D garment model of the garment may not be optimal result. To improve the model, re-projection is performed. Specifically, for a re-projection in regard to a model image, the generated 3D garment model is positioned to the pose estimated from the model image, and then projected to 2D. The 2D projection is then compared with the model image, and the difference is used as feedback to adjust parameters for pose estimation, landmark identification and model garment parsing, garment representation, and for adjusting the human body model. The re-projection process is iteratively performed for predetermined times, or until the difference between the 2D projection and the original model image is less than a predetermined threshold. Accordingly, a refined, final 3D garment model is obtained.

For a re-projection in regard to a garment image, the estimation of the pose is not necessary, and the refinement is performed by projecting the 3D garment model to 2D corresponding to the layout of the garment image (such as front, back left side or right side view), comparing the 2D projected image with the original garment image, using the comparison result to adjust at least one of parameters of landmark identification, parsing, garment representation, and garment registration, and performing the steps landmark mark identification, parsing, garment representation, and garment registration again to obtain an updated 3D garment model. The re-projection process is iteratively performed for predetermined times, or until the difference between the 2D projection and the original model image is less than a predetermined threshold. Accordingly, a refined, final 3D garment model is obtained.

Figure 11:
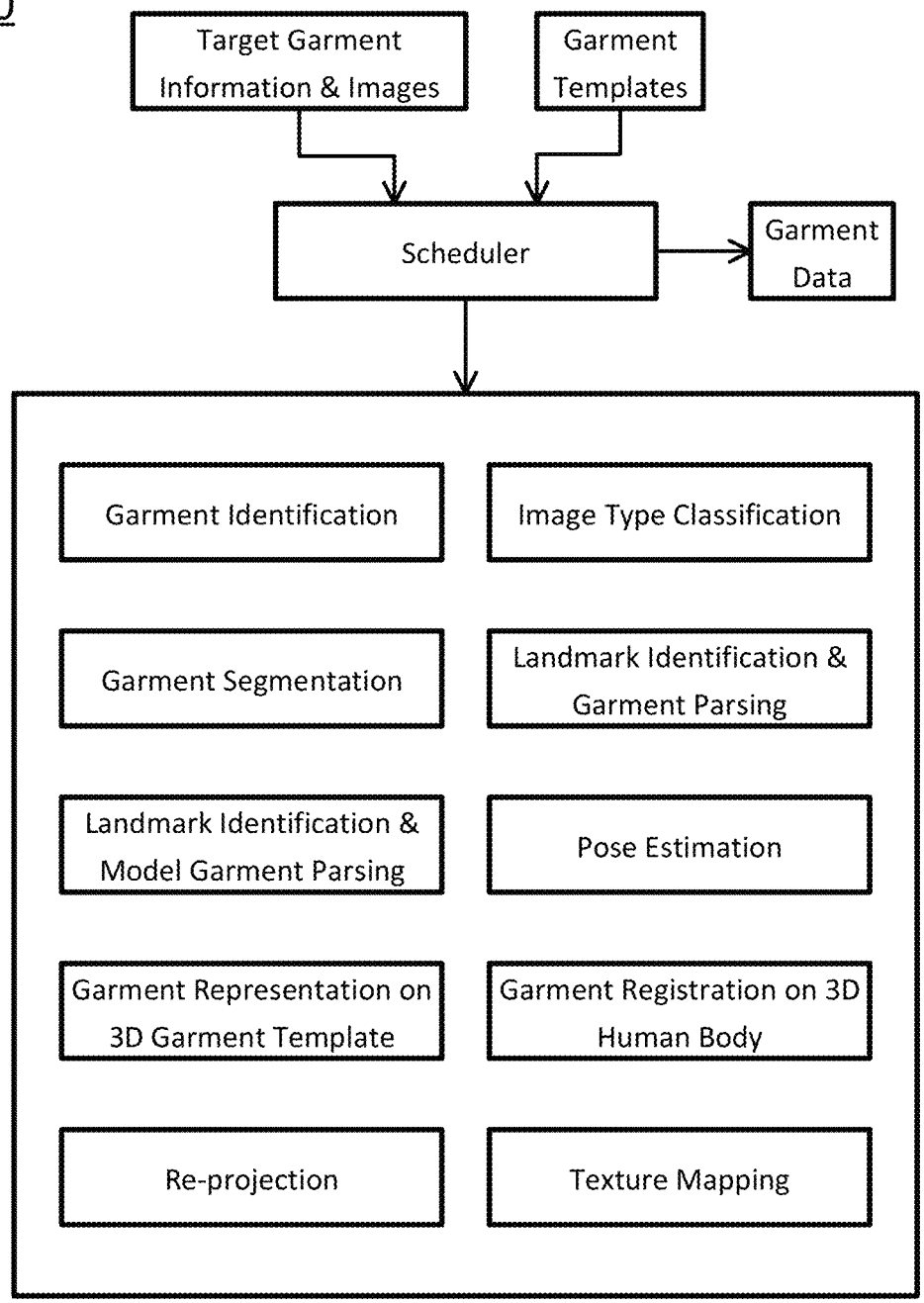
FIG. 11 schematically depicts a workflow of automatically generating a 3D garment model according to further embodiments of the disclosure.

FIG. 11 shows a workflow 1100 according to certain embodiments of the disclosure. In the embodiments, the 3D garment model generating application 118 includes a scheduler to coordinates the procedure, and stores its retrieved information and results to the garment data. Instead of data flow from one module to another, all the data/result are stored in the garment data, and the stored garment data is accessible to all the modules for performing their respective functions. As shown in FIG. 11, the executed scheduler retrieves or instruct certain modules to retrieve target garment information, target images and garment templates, and store that information to garment data. The scheduler further loads the variety of functions to process certain garment data at pre-determined time sequence. Those functions may include retrieving input (target information, target image, and/or results from other modules) from the garment data, and storing their results to the garment data.

As shown in FIG. 11, when the 3D garment model generating application 118 is executed by the processor 112, the scheduler is activated. For a target garment, the scheduler retrieves garment information and garment images and stores them in garment data. Garment data is preferably present in the memory 114 for processing efficiency, and may be in a format of a table to store information related to the garment. After obtaining the target garment information, the scheduler instructs the garment identification module 120 to perform the garment identification process to extract type and attributes of the target garment, and stores the garment type and attributes in the data. At this time, the scheduler may further retrieve a configuration of the garment corresponding to the garment type and stores the configuration of the garment to the garment data. The configuration of the garment may include a mask of the garment, the landmarks of the garment on the mask, parsed pieces or parts of the mask, 2D reference texture of the garment in relative to the parsed pieces, 3D template of the garment, and one or more 3D human body models. The scheduler further instructs the image type classification module 122 to perform image classification on each of the images of the target garment, and the result of whether the image is a garment image or a model image is stored in the garment data. In certain embodiments, the input for the image classification may not only include the image, but also the garment identification of the image. In other words, the garment identification result can be used to help the image classification process to determine whether the image contains the garget garment only, or contains the garment dressed on a model, or contains no target garment at all.

When the image is the garment image containing the garment only, the scheduler instructs the garment segmentation module to 124 to perform garment image segmentation. A mask is obtained for the target garment, and the 2D garment template containing landmark points and parsed parts is deformably registered to the mask of the target garment image, so as to obtain landmark points and parsed parts of the target garment. The landmark points and the parsed parts of the target garment are also stored in the garment data.

When the image is the model image, the scheduler instructs the garment segmentation module 124 to perform garment image segmentation. The process gives a mask for the target garment, where the mask also indicates the pose of the model. The corresponding garment template containing landmark points and parsed parts is retrieved from the garment data, and is deformably registered to the mask of the model image, so as to obtain landmark points and parsed parts of the target garment. In certain embodiments, the scheduler further instructs the pose estimation module 130 to estimate pose of the model in the model image. In certain embodiments, the garment segmentation of the model image and the pose estimation of the model in the model image may be performed together. The segmentation result and the pose of the model are stored in the garment data.

When the landmarks and the parsed parts from one or more images are available, the scheduler uses that information and the 3D garment template for garment representation. Specifically, the garment representation is performed by fitting the landmark points to landmark points of the 3D garment template, and the result is stored in the garment data. The garment representation is actually a set of parameters that can be used to generate a 3D representation of the target garment.

The scheduler instructs the model representation module 134 to register the 3D representation of the target garment to the 3D human body model. The registration is performed by aligning the landmark points of the garment in the 3D representation to the joints of the 3D human body model, so as to "dress" the target 3D garment model on the human body. After the registration, the 3D representation dressed on the human body may be stored in the garment data, and is named preliminary 3D garment model because the garment model may not be optimal.

To improve the preliminary garment model, the scheduler arranges re-projection process. Specifically, the generated preliminary 3D garment model is positioned to the pose estimated from the model image, and then projected to 2D. The 2D projection is then compared with the model image (from which the pose was estimated), and the difference is used as feedback to adjust parameters for pose estimation, landmark identification and model garment parsing, garment representation, and for adjusting the human body model. The re-projection process is iteratively performed for a predetermined times, or until the difference between the 2D projection and the original model image is less than a predetermined threshold.

In certain embodiments, texture is rendered for each of the preliminary 3D garment model and the intermediate 3D garment model during the re-projection cycles, and the texture of those models are used to facilitate the refinement of the 3D garment model. In certain embodiments, the final 3D garment model is rendered with texture, which is beneficial for user's view.

In certain embodiments, the 2D projection includes projection of the 3D garment model for garment only image and the difference is calculated to improve the 3D garment model in the similar way as described above.

In another aspect, the present disclosure relates to a non-transitory computer readable medium storing computer executable code. The code, when executed at a processer of a computing device, may perform the method 900 as described above. In certain embodiments, the non-transitory computer readable medium may include, but not limited to, any physical or virtual storage media. In certain embodiments, the non-transitory computer readable medium may be implemented as the storage device 116 of the computing device 110 as shown in FIG. 1.

In summary, certain embodiments of the present disclosure provide an automatic, cost-effective way to generate 3D garment model of a garment based on the description and 2D images. Further, a re-projection method is used to adjust the 3D garment model by projecting the 3D garment model of the garment to 2D, comparing the 2D projection with the original 2D image, and using the differences to adjust parameters of the model.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

References:

1. Bin Zhou et al., Garment Modeling from a Single Image, Pacific Graphics, 2013, vol 32, No. 7.

2. Shan Yang et al., Detailed Garment Recovery from a Single-View Image, 2016, ArXiv:1608.01250v4.

3. Moon-Hwan Jeong et al., Garment capture from a photograph, Computer Animation and Virtual Worlds, 2015, vol 26, issue 3-4.

4. Knowledge Base Population (KBP), https://nlp.stanford.edu/projects/kbp/5.

5. Ziwei Liu et al., Fashion Landmark Detection in the Wild, 2016, ArXiv:1608.03049v1.

6. https://www.marvelousdesigner.com/product/overview 7. http://www.cs.cmu.edu/~vramakri/poseMachines.html 8. Vivek Kwatra et al., Graphcut Textures: Image and Video Synthesis Using Graph Cuts, ACM Transactions on Graphics (TOG), 2003, vol 22, issue 3.

9. Shaoqing Ren et al., Faster R-CNN: Towards Real-Time Object Detection with Region Proposal Networks, 2016, arXiv:1506.01497v3.

10. Jituo Li et al., Fitting 3D garment models onto individual human models, Computers & Graphics, 2010, vol 34, issue 6, pp 742-755.

11. Remi Brouet et al., Design preserving garment transfer, ACM Transactions on Graphics, 2012.

What is claimed is:

1. A method for generating a three-dimensional (3D) garment model, the method comprising:

providing, by a computing device, description and at least one image of the garment;

identifying, by the computing device, type and attributes of the garment from the description;

classifying, by the computing device, the at least one image to obtain classification of the at least one image as a garment image having the garment or a model image having the garment dressed on a first model;

segmenting, by the computing device, the at least one image based on the type of the garment and the classification of the image to obtain a mask of the garment;

determining, by the computing device, landmarks of the garment in the at least one image using the mask, and parsing the garment in the at least one image into a plurality of parts;

fitting, by the computing device, the landmarks to a 3D garment template corresponding to the type of the garment to obtain 3D garment representation;

registering, by the computing device, the 3D garment representation to a second model to obtain a preliminary 3D garment model dressed on the second model, wherein the second model is a 3D human body model;

projecting, by the computing device, the preliminary 3D garment model dressed on the second model to at least one 2D projected image; and comparing, by the computing device, the at least one 2D projected image with corresponding one of the at least one image, so as to refine the preliminary 3D garment model to obtain the 3D garment model.

2. The method of claim 1, wherein the type of the garment is a category of the garment comprising sweater, shirt, skirt, T shirt and pant, and the attributes of the garment comprises color, material, neckline, and gender of the garment.

3. The method of claim 2, wherein the step of identifying the type and attribute of the garment is performed by retrieving the type and attribute from a product database or by extracting the type and attribute from a shopping webpage of the garment.

4. The method of claim 1, wherein the step of classifying the at least one mage is performed by a neural network, the neural network comprises concatenated convolution blocks to extract semantic features from the at least one image, and each of the convolution blocks comprises 2D convolution layer, a maxpooling layer, and a batch norm layer.

5. The method of claim 1, wherein the step of segmenting the at least one image comprises, when the at least one image is classified as the garment image: segmenting the at least one image using graph cut.

6. The method of claim 1, wherein the step of segmenting the at least one image comprises, when the at least one image is classified as the model image: locating a bounding box enclosing garment region of the at least one image using Faster region convolutional neural network (Faster R-CNN), and segmenting the at least one image using fully convolutional neural network (FCN).

7. The method of claim 1, wherein the step of determining landmarks is performed using a neural network.

8. The method of claim 1, wherein the step of determining the landmarks and parsing the garment comprises deforming a 2D garment template to the mask, wherein the 2D garment template is retrieved based on the type of the garment, and comprises landmark points and parsing of the 2D garment template.

9. The method of claim 1, further comprising,
after classifying the at least one image as a model image:
estimating pose of the first model in the model image; and before the step of projecting: positioning the second model in the estimated pose of the first model in the model image.

10. The method of claim 1, further comprising: rendering texture on the 3D garment model.

11. A method for generating a three-dimensional (3D) garment model, the method comprising:

providing, by a computing device, at least one image of a garment;

generating, by the computing device, a 3D garment representation based on the at least one image;

registering, by the computing device, the 3D garment representation to a 3D model to obtain a preliminary 3D garment model dressed on the 3D model;

projecting the preliminary 3D garment model dressed on the 3D model to at least one 2D projected image; and comparing the at least one 2D projected image with corresponding one of the at least one image, so as to refine the preliminary 3D garment model to obtain the 3D garment model.

12. The method of claim 11, further comprising: classifying the at least one image of the garment as a garment image having the garment and a model image having the garment dressed on a first model.

13. The method of claim 12, further comprising, when the at least one image is a model image:

estimating a pose of the first model in the model image to obtain an estimated pose; and positioning the human body model in the estimated pose, wherein the first model is a 2D model and the 3D model is a 3D human body model.

14. The method of claim 13, further comprising, before generating the 3D garment representation: determining landmarks of the garment in the at least one image, and fitting the landmarks to a garment template to obtain the 3D garment representation.

15. The method of claim 11, further comprising identifying type and attributes of the garment from description of the garment.

16. The method of claim 11, wherein the steps of generating, registering, projecting and comparing are iteratively performed until the difference between the at least one 2D projected image and corresponding one of the at least one image of the garment is less than a predetermined value.

17. A system for generating a 3D garment model, the system comprising a computing device, the computing device comprising a processor and a storage device storing computer executable code, wherein the computer executable code, when executed at the processor, is configured to perform the method of claim 11.

18. A non-transitory computer readable medium storing computer executable code, wherein the computer executable code, when executed at a processor of a computing device, is configured to:

provide at least one image of a garment;

generate a 3D garment representation based on the at least one image;

register the 3D garment representation to a 3D model to obtain a preliminary 3D garment model dressed on the 3D model;

project the preliminary 3D garment model dressed on the 3D model to at least one 2D projected image; and compare the at least one 2D projected image with corresponding one of the at least one image, so as to refine the preliminary 3D garment model to obtain the 3D garment model.

19. The non-transitory computer readable medium of claim 18, wherein the computer executable code is further configured to: classify the at least one image of the garment as a garment image having the garment and a model image having the garment dressed on a first model.

20. The non-transitory computer readable medium of claim 19, wherein the computer executable code is further configured to, when the at least one image is a model image:
estimate a pose of the first model in the model image to obtain an estimated pose; and
position the 3D model in the estimated pose,
wherein the first model is a 2D model and the 3D model is a 3D human body model.

* * * * *